United States Patent [19]

Scheidler

[11] 4,136,311
[45] Jan. 23, 1979

[54] DUAL RATE VOLTAGE REGULATOR

[76] Inventor: Ralph E. Scheidler, 7415 SE. Johnson Creek Blvd., Portland, Oreg. 97206

[21] Appl. No.: 798,640

[22] Filed: May 19, 1977

[51] Int. Cl.² .............................................. H02J 7/14
[52] U.S. Cl. ...................................... 322/28; 320/37; 320/64; 322/73
[58] Field of Search ...................... 320/37, 38, 61, 64, 320/68; 322/28, 73

[56] References Cited

U.S. PATENT DOCUMENTS

| | | | |
|---|---|---|---|
| 3,296,516 | 1/1967 | Paine et al. | 320/64 X |
| 3,443,200 | 5/1969 | Kuhn | 322/28 X |
| 3,581,150 | 5/1971 | Kirk et al. | 322/28 X |
| 3,835,367 | 9/1974 | Wiley | 322/28 |
| 3,868,558 | 2/1975 | Winkley et al. | 320/68 X |

*Primary Examiner*—Robert J. Hickey
*Attorney, Agent, or Firm*—Oliver D. Olson

[57] ABSTRACT

A voltage regulator includes a first normally closed switch arranged for releasably connecting the field coil terminal of an engine-driven DC alternator or DC generator to its appropriate positive or negative output terminal. The first switch is controlled by an electric actuator having an electric circuit arranged for connection across the output terminals of the alternator or generator and is operable at a predetermined lower level output voltage to open the first switch, whereby to limit the output charging voltage to said lower level which is predetermined to effect charging of the battery without significant consumption of water. A second switch in the electric circuit of the first switch actuator is controlled by an electric actuator arranged for connection across the output terminals of the alternator or generator and is operable at a predetermined higher level output voltage to close the second switch and activate the first switch actuator to open the first switch and reduce the charging voltage to said lower level from said higher level which is predetermined to effect charging of the battery quickly, whereupon charging continues at the lower level until the engine is shut down.

7 Claims, 1 Drawing Figure

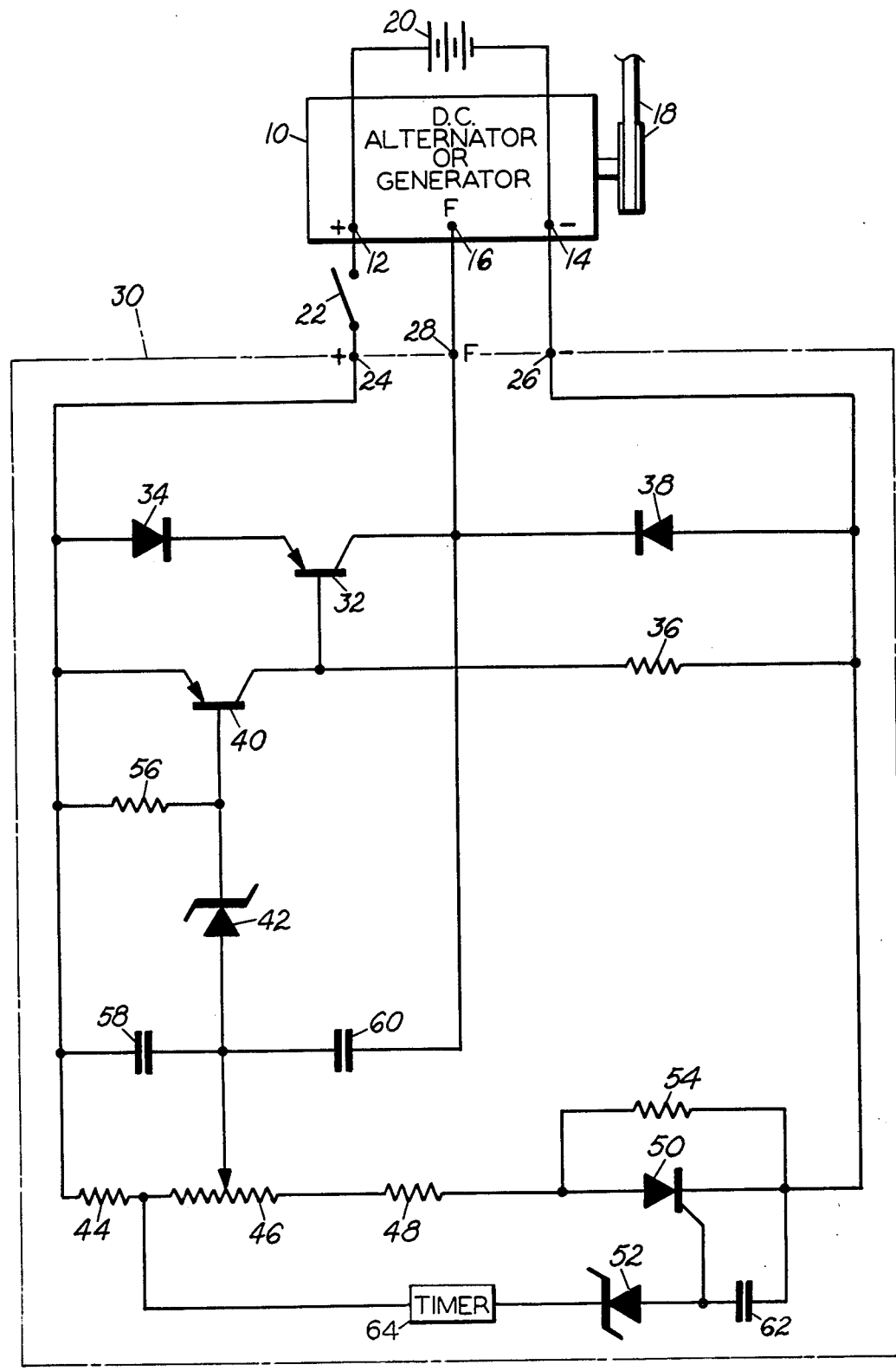

DUAL RATE VOLTAGE REGULATOR

BACKGROUND OF THE INVENTION

This invention relates to voltage regulators for engine-driven DC alternators or DC generators, and more particularly to a voltage regulator which provides two levels of DC voltage regulation.

Conventional voltage regulators control the DC voltage output of a DC alternator or DC generator so as to produce a predetermined rate of charge. This rate of charge is a compromise: If the voltage is adjusted so as to recharge the battery ideally, the battery gases and consumes water. If the voltage is adjusted so as to avoid gasing and consumption of water, the charge rate is so low that the battery does not charge properly.

The problem presented by this compromise is magnified in the case of the new "maintenance free" batteries, since it is not possible to have a single regulator setting that will maintain such batteries in short run applications and still not overcharge a conventional battery on long distance runs.

SUMMARY OF THE INVENTION

In its basic concept, this invention provides a voltage regulator by which an engine-driven DC alternator or DC generator charges, on startup, at a sufficiently high level of voltage regulation to afford quick charging of the engine battery to a predetermined level and thereafter to continue charging at said lower level of voltage regulation which is predetermined to maintain the battery charge without significant gasing and consumption of water.

It is by virtue of the foregoing basic concept that the principal objective of this invention is achieved; namely, to overcome the aforementioned disadvantages and limitations of prior voltage regulators.

Another important object of this invention is the provision of a dual rate voltage regulator of the class described which is operable with all types of conventional DC alternators and DC generators.

Still another important object of this invention is the provision of a dual rate voltage regulator of the class described which is of simplified construction for economical manufacture and is of rugged design for maintenance free operation over a long service life.

The foregoing and other objects and advantages of this invention will appear from the following detailed description, taken in connection with the accompanying drawing of a preferred embodiment.

BRIEF DESCRIPTION OF THE DRAWING

The single FIGURE is a schematic electrical diagram of a dual rate voltage regulator embodying the features of this invention.

DESCRIPTION OF THE PREFERRED EMBODIMENT

The drawing illustrates a conventional DC generator or DC alternator 10 which is provided with positive, negative and field coil terminals 12, 14 and 16, respectively, and is driven by a vehicle engine (not shown) by means of a conventional pulley and belt coupling 18. The vehicle battery 20 is connected across the positive and negative terminals 12 and 14 of the generator or alternator, as illustrated, and the voltage regulator is releasably connected to the generator alternator, as through a switch 22 which may be the ignition switch of the vehicle engine.

The dual rate voltage regulator of this invention is an integral unit which is provided with positive, negative and field coil terminals 24, 26 and 28, respectively, corresponding to the positive, negative and field coil terminals of the generator or alternator. Conductors interconnect the corresponding terminals, with the switch 22 interposed in the conductor connecting the appropriate positive or negative terminals. In the embodiment illustrated, the switch is interposed in the conductor interconnecting the positive terminals.

The housing, indicated by the broken line 30, which mounts the terminals, confines therein the electrical circuitry making up the dual rate voltage regulator.

An electric switch is provided for interconnecting the field coil terminal 28 and the appropriate one of the positive or negative terminals, herein illustrated as the positive terminal 24. In the embodiment illustrated, the switch comprises the collector-emitter circuit of a transistor 32. The collector is connected to the field coil terminal 28 and the emitter is connected through a diode 34 to the positive terminal 24. The transistor is biased "on" by means of a resistor 36 which interconnects the transistor base and the negative terminal 26, and the diode 38 which interconnects the collector and negative terminal.

The emitter-collector switch of transistor 32 is controlled by a switch actuator which includes the base-emitter circuit of the transistor. The base of transistor 32 is connected to the collector of a second transistor 40 the emitter of which is connected through diode 34 to the emitter of transistor 32. Thus, upon activation of transistor 40 the emitter-collector thereof functions as a switch to connect the base and emitter of transistor 32 together, deactivating the latter. The base-emitter of transistor 40 is in an electric circuit which is connected across the positive and negative terminals 24 and 26. Thus, the circuit extends from the positive terminal 24 through the emitter-base circuit of transistor 40, through zener diode 42 and voltage divider resistors 44, 46 and 48, thence through the silicon controlled rectifier 50 to the negative terminal 26.

The zener diode 42 is chosen to fire at a predetermined lower level of voltage which establishes the lower level of voltage regulation. The firing voltage of the zener diode is established by adjustment of the voltage divider potentiometer resistor 46.

The silicon controlled rectifier 50 functions as a switch in the electric circuit of the actuator for the first switch transistor 32. The control electrode or gate of the silicon controlled rectifier functions as the actuator of the switch, and it is connected across the positive and negative terminals 24 and 26 through a second zener diode 52. This zener diode is chosen to fire at a predetermined higher voltage than the zener diode 42, to establish a higher level of voltage regulation.

As an illustration, let it be assumed that the vehicle battery 20 is a conventional 12 volt type. Conventional single rate voltage regulators presently in use are set at the compromise level of about 14.2 volts. As discussed hereinbefore, this level of voltage regulation provides adequate charging of a 12 volt battery, but it does so with considerable gasing and consumption of water.

For use with the exemplified 12 volt battery, the dual rate voltage regulator of this invention is adjusted to provide, for example, a lower level voltage regulation of about 13.2 volts, set by the zener diode 42, and a higher level voltage regulation of about 14.8 volts, set by the zener diode 52. The higher level of voltage regulation is chosen to quickly recharge the battery after cranking, to replace the ampere-hours utilized during cranking. The lower level voltage regulation is chosen for continuing the recharging of the battery at a level which maintains the load demand, without any significant battery gasing or water consumption. This minimizes battery maintenance and prevents premature plate damage, resulting in significantly increased battery life.

It will be appreciated that the lower and higher levels of voltage regulation may be set to various values other than those exemplified, to accommodate a wide variety of battery capacities and uses.

The operation of the dual rate voltage regulator described hereinbefore is as follows: Let it be assumed, for illustration, that the DC alternator or generator is driven by the internal combustion engine of a boat, truck, passenger car, or other vehicle and that the vehicle battery is of the 12 volt type and that the switch 22 represents the ignition switch of the vehicle engine.

Upon closure of the switch 22, preparatory to starting the engine through an electrical starter (not shown), the emitter-collector switch of transistor 32 is activated to its normally "on" condition by the bias provided by resistor 36 and diode 38. Accordingly, the field coil terminal 28 is connected to the positive battery terminal 24 through the normally closed emitter-collector switch of transistor 32 and the diode 34.

With the engine now activated, the DC generator or alternator causes voltage to rise progressively as the ampere-hours used for cranking are replaced in the battery 20. Depending upon the extent of cranking, this replacement charging varies in time, for example from about 5 seconds to about a minute.

Completion of the replacement charging results in the voltage rising to the higher level set by the zener diode 52, causing the latter to fire. This completes the electric circuit of the control gate of the silicon controlled rectifier 50, whereupon activation of the latter functions as a second switch to complete the electric circuit through the zener diode 42 and the base-emitter of transistor 40.

Completion of the electric circuit just described, results in activation of the zener diode 42 at the lower voltage level of 13.2 volts in accordance with this example. The transistor 40 thus is turned "on", whereupon the transistor 32 is turned "off" and the associated emitter-collector switch is opened.

Opening of the emitter-collector switch of transistor 32 results in deenergization of the field coil of the generator or alternator 10, thereby reducing the voltage output to a level which reestablishes the blocking state of zener diode 42. The transistor 40 thus is turned "off", turning "on" the transistor 32 and closing its switch to reenergize the field coil.

Since the silicon controlled rectifier 50 stays latched "on" as long as DC voltage appears across the voltage divider resistances and the silicon controlled rectifier, the zener diode 42 fires intermittently as the voltage rises to the exemplified lower level of 13.2 volts and then falls again. This provides continued regulation at the lower voltage level, maintaining sufficient charging of the battery to maintain the load demand without any significant battery gasing or water comsumption.

When the engine is shut down, by opening the ignition switch 22, the regulator is shut "off" and the silicon controlled rectifier 50 is unlatched. The regulating cycle then is repeated upon closure of the ignition switch and restarting of the engine.

In the preferred embodiment illustrated, a resistance 54 of predetermined value is connected across the silicon controlled rectifier 50 so that the zener diode 42 fires when the voltage reaches a level slightly higher than the level of the exemplified 14.8 volts which causes the zener diode 52 to fire. This protects against the development of excessively high and therefore damaging voltage at the generator or alternator 10 in the event of malfunctioning of the silicon controlled rectifier 50.

Resistor 56 and capacitors 58 and 60 serve to smooth out the operation of the regulator, and capacitor 62 serves to prevent premature turn-on of the silicon controlled rectifier 50.

There may be special circumstances of heavy battery use without simultaneous charging, as when the vehicle engine is turned off, that it may be desirable to continue charging the battery at the higher voltage level. For this purpose a timer 64 may be associated with the second switch actuator zener diode 52, either in series, or in parallel, to maintain the diode inactive for a predetermined time after the alternator or generator 10 has been energized. A variety of types of timers may be utilized. Exemplary of one such type is the integrated circuit Model No. SE-555 manufactured by Signetics Corporation.

From the foregoing it will be appreciated that the voltage regulator of the present invention provides a regulated higher voltage level which functions to recharge a battery quickly, following engine cranking, to replace the ampere-hours used for cranking, and thereafter to reduce the voltage to a regulated lower level for continued charging of the battery at a level which maintains the load demand without any significant battery gasing or water consumption. This mode of operation eliminates battery sulfation which ordinarily results from undercharging, eliminates premature plate damage which ordinarily results from battery gasing, and significantly increases battery life while simultaneously minimizing the necessity of battery maintenance. The battery is maintained in proper charge at all times, whether it is being used in short or long run applications.

It will be apparent to those skilled in the art that various changes may be made in the type of components and circuit arrangement described hereinbefore, without departing from the spirit of this invention.

Having now described my invention and the manner in which it may be used, I claim:

1. A dual rate voltage regulator for a direct current alternator or generator having a field coil terminal and positive and negative output terminals for connection across a battery, the regulator comprising:
 (a) positive, negative and field coil terminals arranged for connection to corresponding terminals of a direct current alternator or generator,
 (b) first electrically actuated switch means for connecting said field coil terminal to one of said positive and negative terminals,
 (c) first electric switch actuator means arranged to be connected across said positive and negative terminals for operation at a predetermined low level output voltage from a direct current alternator or generator to open said first switch means, whereby to limit the output charging voltage to said low level, (d) second electrically actuated switch means arranged to releasably connect said first electric switch actuator means across said positive and negative terminals, and (e) second electric switch actuator means connected across said positive and negative terminals and operable at a predetermined higher level output voltage from the direct current alternator or generator to close said second switch means and connect said first switch actuator means across said terminals, whereby to operate the first switch actuator means to open said first switch means and reduce the direct current voltage output of the alternator or generator from said higher level to said low level.

2. The dual rate voltage regulator of claim 1 wherein the first switch means comprises the emitter-collector of a first transistor, and the first switch actuator means includes the base-emitter of the first transistor in series with the emitter-collector of a second transistor the base-emitter of which is in series with a zener diode which is activated at said low level of output voltage.

3. The dual rate voltage regulator of claim 1 wherein the second switch means comprises a silicon controlled rectifier and the second switch actuator means includes the control electrode of the silicon controlled rectifier in series with a zener diode which is activated at said higher level of output voltage.

4. The dual rate voltage regulator of claim 1 wherein the first switch means comprises the emitter-collector of a first transistor, the first switch actuator means includes the base-emitter of the first transistor in series with the emitter-collector of a second transistor the base-emitter of which is in series with a zener diode which is activated at said low level of output voltage, the second switch means comprises a silicon controlled rectifier, and the second switch actuator means includes the control electrode of the silicon controlled rectifier in series with a zener diode which is activated at said higher level of output voltage.

5. The dual rate voltage regulator of claim 4 wherein the said electric circuit includes voltage divider means for predetermining the level of said low voltage output.

6. The dual rate voltage regulator of claim 4 including resistance means connected across the silicon controlled rectifier for activating the zener diode of the first switch actuator at a level of voltage slightly higher than the level of voltage which effects activation of the zener diode associated with the silicon controlled rectifier.

7. The dual rate voltage regulator of claim 1 including timer means associated with the second switch actuator means for maintaining the latter inactive for a predetermined time after energization of the alternator or generator.

* * * * *